April 8, 1958    G. SPECKHARDT ET AL    2,830,104
PROCESS FOR THE RECOVERY OF NAPHTHALENE
Filed July 15, 1954
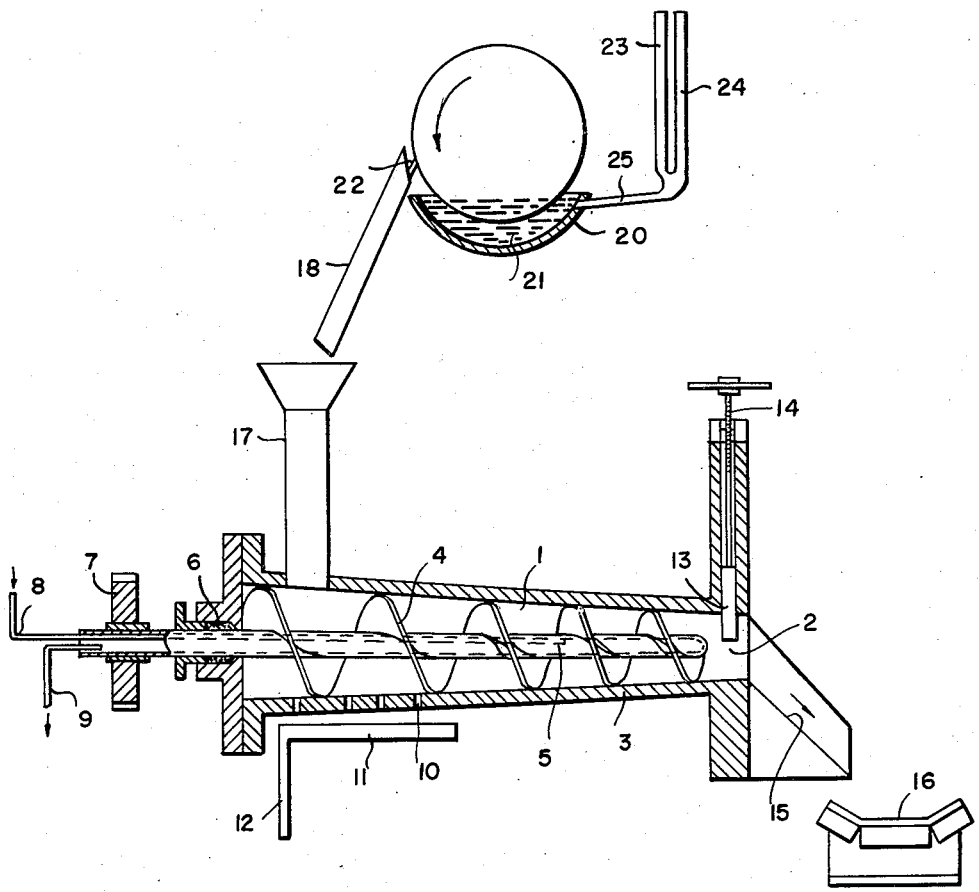
INVENTOR
George Speckhardt
Karlheinz Hennig
BY Cushman, Darby & Cushman
ATTORNEYS

2,830,104

PROCESS FOR THE RECOVERY OF NAPHTHALENE

Georg Speckhardt and Karlheinz Hennig, Bochum, Germany

Application July 15, 1954, Serial No. 443,685

Claims priority, application Germany September 25, 1952

8 Claims. (Cl. 260—674)

This application is a continuation-in-part of application Serial No. 381,780, filed September 23, 1953, in which a process for the production of naphthalene warm pressed material with a freezing point of above 79° C. is described, in which the naphthalene containing oil is made into a commercially usable warm pressed material by subjecting measured amounts of the crude naphthalene at suitable temperature to a continuous pressing procedure which makes it possible by kneading action at elevated pressure to continuously eliminate the attending oil, preferably in a screw or worm press.

According to a further proposal in Serial No. 381,780, the crude naphthalene, after complete crystallization and cooling, can be used in the above-described press process and worked to a warm pressed material. This entire cooling can take place with customary continuous cooling apparatus. If one starts from relatively naphthalene-poor oils, the same are suitably previously subjected to a preliminary filtration with known filtration apparatus to bring about an enrichment of the naphthalene.

In subsequent research on these processes, it has now been found that the desired effect of high melting point can be suitably increased if, before the preliminary filtration, suitable selective solvents are added. This procedure is especially advantageous if the starting material contains mechanical impurities which make the end product unsalable, in spite of the presence of the desired melting point. These processess are carried out by dissolving the crude naphthalene in a solvent at elevated temperature, subjecting it to a filtration, and thereafter carrying out the naphthalene crystal separation through cooling. The amount of naphthalene added, of course, should exceed the limit of solubility at the temperature of cooling. The crystal mass can then be prepared in a similar way as described in application Serial No. 381,780, and can be worked to a warm pressed material.

The addition of selectively acting solvents can also be used profitably with partially purified crude naphthalene as the starting material in order to selectively bring the accompanying oil into solution whereby, after pressing, the degree of purity of the warm pressed material produced is especially high. Thus, it is possible to manage with proportionally small amount of additional solvent, e. g. 0.5 part to 10 parts per 100 parts of naphthalene and thereby save a preliminary concentration of the naphthalene crystals through filtration.

As solvents may be used: benzene or homologues, e. g., toluene, o-, m-, or p-xylene, mono- or poly-hydric alcohols, e. g., methyl alcohol, ethyl alcohol, isopropyl alcohol, butyl alcohol, ketones, e. g., acetone and methyl ethyl ketone, esters, more especially, esters of carboxylic acids, e. g., acetic acid-ethyl-ester, ethers, e. g., ethyl ether. It is also sometimes advantageous to work with the simultaneous addition of water. The best selective effectiveness may be obtained through the choice of a suitable temperature, or in the choice of solvents having a relatively wide variation in solubility for naphthalene depending on the temperature.

Example 1

100 parts of crude naphthalene from steaming a naphthalene containing apparatus with a freezing point of 57.5° C. was dissolved in 20–100 parts of toluene at elevated temperature (50–100° C.) and freed of mechanical impurities by filtration. The solution was then cooled under 30° C. in order to make possible the formation of naphthalene crystals. The crystal mass was separated from the remaining liquid portion on a vibration sieve and, thereafter, pressed in a worm press to a warm pressed material with a freezing point of 79.2° C.

Example 2

100 parts of crude naphthalene from the distillation plant with a freezing point of 70.2° C. was mixed with a small amount (0.5–10 parts) of methyl alcohol-water (80% methyl alcohol to 20% water) and directly fed to the worm press, whereby a warm pressed material having a freezing point of 79.5° C. was obtained.

To complete the disclosure, application Serial No. 381,780 is incorporated in toto below.

In the distillation of coal tar or the like an oil fraction containing naphthalene is generally produced. This oil fraction is separately subjected to a distillation in which an impure naphthalene is recovered, the solidification point of which may vary within wide limits. For many years, the subsequent further treatment of this impure naphthalene for the purpose of producing pure marketable naphthalene has been customary.

The warm crude naphthalene is first freed from phenols and then cooled in vats. When the mother liquor has been drained off, the crystallized naphthalene is hacked out of the vat, comminuted and centrifuged, whereby a somewhat purer crude naphthalene is obtained. This product is converted under mild heating into a doughy state in which it is introduced in portions into a press having sieve-like walls and a corresponding base. By means of a ram, the material is compressed and the mother solution still adhering to the naphthalene crystals is thus separated off to a considerable extent, while the naphthalene is compressed into the form of a cake. With this method of operation, a pure naphthalene, having a solidification point of over 79° C., can be obtained, depending upon the choice of the working temperature. The naphthalene cake removed from the press, which normally has a weight of about 20 kg. and a diameter of about 500 mm., is externally still covered with oil which must be wiped off as far as possible. In order to make this naphthalene ready for dispatch, it must thereafter be suitably comminuted.

After some time, the method was adopted of first freeing this liquid naphthalene-containing oil fraction, which is obtained in the hot state in the distillation of tar, from phenols or the like, without the aforesaid intermediate crystallization and, thereafter, distilling it in high selective columns. However, it is thus possible only to produce a naphthalene having a solidification point of about 78° C. The reason for this poor result resides in that during the distilaltion, certain impurities of the naphthalene having the same or substantially the same boiling point are not removed to a sufficient extent, whereby a further increase in the solidification point of the naphthalene is rendered impossible. If it is nevertheless desired to raise the solidification point above about 78° C., it is necessary to effect before the distillation a chemical washing of the naphthalene with sulfuric acid and lye, in which case the impurities boiling within the naphthalene are substantially destroyed. It is then possible to obtain a commercial naphthalene having a solidification point of over 78° C. by distilling the said washed material.

Both processes are complicated and costly.

According to the invention, warm pressed naphthalene is obtained in a substantially simpler manner, intermediate crystallization in vats, reheating and chemical washing of the naphthalene with subsequent highly selective distillation being unnecessary.

According to the invention, the crude naphthalene fraction emanating from the distillation of crude tar or oil is worked up directly to form a normal commercial warm pressed material, preferably without previous removal of phenols, by first separating impure solid naphthalene from the starting material by cooling to a suitable temperature below 60° C. and then subjecting the said naphthalene in a lumpy condition, after separation from the mother solution, to a preferably continuous pressing operation in which the material is pressed out in a thin layer with continuous movement. The pressing arrangement advantageously so operates that the naphthalene is compressed to some extent with a kneading action and with a progressive increase of the compressing pressure produced, while the crystals are shifted relatively to one another. The oily impurities are thus substantially eliminated. This pressing arrangement must, in addition, operate continuously in order to produce the advantages according to the invention, that is to say, the material continuously fed through the press is also continuously delivered after the pressing. These conditions are fulfilled in an excellent manner by a so-called worm press, the housing of which is fashioned in the manner of a sieve or made permeable to oil.

The starting material, the naphthalene fraction of which is cooled before entering the press to form lumpy naphthalene or a crystal sludge, looses its liquid oily constituents through the perforated casing of the worm press. The pressed material is delivered in a thin layer or in small lumps, the oily impurities being completely uniformly removed by suitable adjustment of the dimensions of the delivery aperture of the press. By choosing a suitable working temperature, it is possible without difficulty to obtain an end product having a solidification point far higher than 79° C. A naphthalene in the form of small lumps is thus obtained, which is marketable without further treatment.

In a continuous pressing operation, a certain temperature increase of the pressed material occurs in the worm press, owing to the constant relative movement of the crystals with respect to one another. The value of the said temperature increase is dependent upon the temperature at which the material enters and upon the quantity of oil present in the material. The temperature may be regulated by means of a cooling or heating device which is housed, for example, in the worm shaft and/or in the casing of the press. It is thus possible with a high temperature of admission of the material into the machine to produce an appropriate additional cooling during the pressing operation. Alternatively, if the temperature of admission is low, a temperature increase can be produced by means of steam or hot water. It is thus also possible to carry out the pressing, starting with completely solid initial material, without the initial material having first to be brought into a doughy form by a temperature increase. A means is thus provided of working-up without any special preparation, such as mixing with a fresh fraction, low-grade starting products delivered to the working-up installation. Moreover, it is immaterial whether this material has any water content, since the water-content is pressed out of the crystal mixture together with the oil. On the other hand, naphthalene-containing fractions emanating directly from the distillation may be immediately cooled to a considerable extent by means of a cooling cylinder known in the working-up of coal tar, and the more or less dry crystal sludge thus formed may be worked up at normal temperature. The provision of a cooling cylinder or the like, as described, affords, in addition to the possibility of continuous cooling the material as it is produced, the advantage that the quantity of product fed to the press may be regulated by adjusting the speed of the cylinder or the temperature of the cooling water or by regulating the depth of immersion of the cylinder in the oil bath. Instead of the cooling cylinder, cooling drums, cooling worms, mechanical agitating mechanisms, endless cooling belts, or the like, may be employed. Oils having a low naphthalene content are preferably so prepared, for the working-up in the press, that the main quantity of the mother solution is removed after the crystallization by known steps, such as filtering, centrifuging, suction filtering, and the like. It is particularly expedient in this case to employ a vibrating sieve by means of which the solid crystals may be separated from the liquid. The crystal sludge then formed may then be fed to the continuous press for further working-up, as hereinbefore described.

Instead of the worm press, other pressing apparatus, such as trace presses, displacement centrifuges or worm centrifuges may be employed, which operate with a progressive compression of the material, such arrangements being so operated that the material is moved during the pressing operation and is subjected to the pressure increase in a thin layer.

*Examples*

(1) A naphthalene having a solidification point of 79° C. was obtained after a single passage through the worm press from a naphthalene-containing crude oil fraction having a solidification of 57° C. from which the phenols have not been removed.

(2) The solidification point of a naphthalene fraction from which the phenols had not been removed was raised from 65.9° to 79.2° C. when it was passed through the worm press.

(3) Starting with a naphthalene oil fraction having a solidification point of 71.3° C. from which the phenols had been extracted, and which was crystallized on a cooling cylinder, a pressed material having a solidification point of 79.5° C. was obtained after the passage thereof through the worm press.

The process according to the invention may, if desired, be combined with further novel steps for the purpose of producing so-called pure naphthalene, that is to say, naphthalene of which the solidification point lies above 79° C. and, preferably, above 80° C., without any chemical treatment having to be applied to the previously purified naphthalene for this purpose.

According to the invention, pure napthalene (solidification point 80° C. or higher) is obtained without chemical reaction and, if desired, without the usual subsequent re-distillation, by treating the previously purified naphthalene having a solidification point of about 79° C. with a solvent, such as benzene or homologues, cooling the solution until lumpy naphthalene crystallizes and working up the naphthalene thereafter in a thin layer by means of the continuous pressing operation hereinbefore described after the solvent has been separated off. Selective solvents, such as methanol or other monovalent or polyvalent alcohols, ketones, esters and the like, may be employed, either alone or in mixture and with an addition of water to dissolve the starting material. When such media are employed, the heating or cooling of the solvents may, if desired, be entirely or partially omitted. In any case, however, it is important that the pressing be effected in such manner that it takes place in a thin layer with constant movement of the crystals in relation to one another, preferably by means of a worm press. The material to be pressed is substantially freed very uniformly from the solvent in the press, since the material is in a constant motion during the continuous pressing operation and an increasing pressure acts on relatively thin layers of pressed material. Instead of a worm press, other pressing apparatus having a similar operation, for example, a trace press, a displacement centrifuge or a worm centrifuge, may be employed, provided that the pressure therein is exerted on relatively thin layers of material.

The installation for carrying out the process consists substantially of a container in which the material to be pressed is mixed with the solvent, the container preferably comprising a mechanical agitating mechanism and, if desired, also being heatable. The installation further comprises a regulated feed arrangement which delivers regulated quantities of the material to be treated into the pressing apparatus, a worm press or the like, as well as the said pressing apparatus itself. The said installation and the process are distinguished by particular simplicity, while in addition occupying little space. It is thus possible under particularly good conditions to effect a continuous conversion of crude naphthalene or pre-purified naphthalene into pure naphthalene.

*Examples*

(1) A naphthalene crystal mixture having a solidification point of 70° C. was brought to a solidification point of 79.2° C. by treatment in a worm press, thereafter recrystallized from a mixture of benzene, methanol and water and again pressed in the worm press. The pure naphthalene thus obtained had a solidification point of 79.84° C. On subsequent distillation, the solidification point rose to 80° C.

(2) A naphthalene crystal mixture having a solidification point of 67° C. was pressed in a worm press after cooling with an addition of toluene. The delivered material had a solidification point of 79.5° C. After further recrystallization and further pressing, the solidification point rose to 79.9° C.

The drawing represents an apparatus for performing the process according to the invention shown in sectional view.

The apparatus consists of the screw-press 1 fitted with a conically shaped housing 3, the smaller part extending in direction of the discharge end 2. The screw 4 is mounted on a hollow shaft 5, passing through the housing 3 of the press at its wider end and being tightened by a stuffing box 6. On the shaft 5, there is fixed a toothed wheel or similar device which is driven by a prime mover for the screw-press (not shown). Two pipes 8 and 9 are connected from the outside to the hollow shaft of the press serving for the admission or discharge of a liquid or gaseous cooling or heating medium. By suitably adapting the temperature of the medium fed by pipe 8 and drawn off by pipe 9, it is possible to regulate the temperature of the raw material to be pressed inside the press-housing according to the most favorable degree for pressing.

At the lower part of the press-housing, preferably arranged in horizontal position, there are hole or slot-shaped perforations 10 through which the press oil may run off. The oil is then collected in the trough 11 from which the oil can be drawn off by pipe 12.

The aperture of the mouth 2 of the press can be calibrated by a mouth piece 13. This mouth piece 13 is adjusted by means of a spindle 14 in such a way that in the press such pressures are established as required for reaching the desired solidification point of the naphthalene. While the oil separated during the pressing operation is moving towards the wider end of the press and running off through the perforations 10, the solid naphthalene is conveyed through the mouth 2 to a chute 15 from which it falls onto the conveyor belt 16 transporting the naphthalene to the point for further handling.

The raw material to be pressed is fed through a feeding hopper 17. To this the raw naphthalene is fed over a chute 18. A cooling drum 19 feeds the raw material to the aforesaid chute 18. The cooling drum 19 consists of a cylindrically shaped metallic drum maintained by inner cooling with water at a temperature below the solidification point of the naphthalene, preferably below 60° C. This cooling drum turns at a relatively low speed, e. g., a few revolutions per minute, partially emerging into a trough 20 filled to a certain level with the liquid naphthalene oil 21. From the naphthalene oil coming into contact with the cooled drum 19, owing to the low temperature of the drum surface, solid naphthalene is separated in crystallized form which forms a more or less thick coherent layer on the outside of the cooling drum. This layer is then removed from the cooling drum 19 by a scraper 22 in such a way that a comparatively coarse material is obtained which is fed by way of chute 18 to the feeding hopper 17 and from there to the screw press. Solvent can be introduced through line 23 and impure naphthalene through line 24 and the two streams combined in line 25 prior to feeding to the cooling drum 19.

We claim:

1. A process for the production of naphthalene having a melting point above 79° C. from impure naphthalene containing oil having a melting point below 79° C., comprising (1) treating said impure naphthalene with a solvent in an amount of 0.5 to 100 parts per 100 parts of naphthalene, said solvent preferentially dissolving one of naphthalene and the impurities therein, (2) cooling the resulting mixture of impure naphthalene and solvent, in order to obtain naphthalene crystals in lumpy condition, and (3) thereafter treating said impure lumpy naphthalene containing 0.5 to 10 parts of solvent in a continuously operating press under a continuous kneading action while advancing the naphthalene through the press at a progressively increasing pressure as it advances therethrough, said pressure being sufficient to simultaneously express substantially all of the oil from naphthalene so that, by the time the naphthalene has advanced completely through said press, it is in substantially dry form and has a melting point above about 79° C.

2. The process of claim 1, wherein the naphthalene is recrystallized from the solvent before pressing.

3. The process of claim 1, wherein the solvent is an aromatic hydrocarbon.

4. The process of claim 1, wherein the solvent is a ketone.

5. The process of claim 1, wherein the solvent is an alcohol.

6. The process of claim 1, wherein the solvent is an ester.

7. The process of claim 1, wherein a part of the solvent is replaced by water.

8. The process of claim 1, wherein the impure naphthalene has a melting point below 71° C.

References Cited in the file of this patent

UNITED STATES PATENTS 2,321,117  Wilcock _____ June 8, 1943

FOREIGN PATENTS 255,429  Great Britain _____ June 23, 1927